United States Patent
Yamamoto et al.

(10) Patent No.: US 9,499,037 B2
(45) Date of Patent: Nov. 22, 2016

(54) MOUNTING STRUCTURE FOR POWER UNIT OF UTILITY VEHICLE AND UTILITY VEHICLE EMPLOYING SAME MOUNTING STRUCTURE

(71) Applicant: KAWASAKI JUKOGYO KABUSHIKI KAISHA, Hyogo (JP)

(72) Inventors: Teruaki Yamamoto, Kakogawa (JP); Akiyuki Yamasaki, Amagasaki (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/679,277

(22) Filed: Apr. 6, 2015

(65) Prior Publication Data
US 2016/0288637 A1 Oct. 6, 2016

(51) Int. Cl.
*B60K 5/12* (2006.01)
*B60K 17/00* (2006.01)

(52) U.S. Cl.
CPC *B60K 5/12* (2013.01); *B60K 17/00* (2013.01)

(58) Field of Classification Search
CPC ...... B60K 5/12; B60K 17/00; B60K 5/1216; B60K 5/04; B60K 5/1208
See application file for complete search history.

(56) References Cited

U.S. PATENT DOCUMENTS

| | | | | |
|---|---|---|---|---|
| 3,825,090 A | * | 7/1974 | Runkle | B60K 5/1216 180/292 |
| 3,903,738 A | * | 9/1975 | Malchow | B60K 5/12 73/114.15 |
| 4,467,992 A | * | 8/1984 | Morimura | B60K 5/12 180/300 |
| 4,487,285 A | * | 12/1984 | Tomita | B62M 7/02 180/228 |
| 4,487,287 A | * | 12/1984 | Watanabe | B60K 5/1208 180/297 |
| 5,740,876 A | * | 4/1998 | Shimose | B60K 5/1216 180/232 |
| 6,823,960 B2 | * | 11/2004 | Shimizu | B60K 5/12 180/228 |
| 7,506,718 B2 | | 3/2009 | Morita et al. | |
| 8,727,063 B1 | | 5/2014 | Yamamoto et al. | |
| 2013/0068442 A1 | * | 3/2013 | Di Stefano | F25B 49/02 165/253 |
| 2014/0187372 A1 | * | 7/2014 | Kouma | B60K 5/1216 474/150 |
| 2014/0311842 A1 | * | 10/2014 | Kambayashi | B60K 1/00 188/371 |
| 2015/0053496 A1 | * | 2/2015 | Jomaa | G06F 17/50 180/292 |
| 2015/0090514 A1 | * | 4/2015 | Oshima | B60K 5/12 180/233 |

* cited by examiner

*Primary Examiner* — Darlene Condra
(74) *Attorney, Agent, or Firm* — Wenderoth, Lind & Ponack, L.L.P.

(57) ABSTRACT

A mounting structure for a power unit of a utility vehicle. The power unit includes: a body part; an output shaft extending in frontward and rearward directions through the body part; a first attaching member provided with a first damper and attaching a lower end part of the body part to a vehicle body frame of the utility vehicle; and a torque rod located in an upper part of the body part and constructed between the body part and the vehicle body frame so as to restrict rolling of the body part in vehicle width directions. A body side attaching part of the torque rod, attached to the body part, is located on an extension line of a compression axis direction of the first damper in side view of the power unit.

8 Claims, 8 Drawing Sheets

MOUNTING STRUCTURE FOR POWER UNIT OF UTILITY VEHICLE AND UTILITY VEHICLE EMPLOYING SAME MOUNTING STRUCTURE

BACKGROUND OF THE INVENTION

1. Field of the Invention

The present invention relates to a mounting structure for a power unit of a utility vehicle and a utility vehicle employing the same mounting structure.

2. Description of the Related Art

In the conventional art, in a power unit of a utility vehicle, a mounting structure for a power unit to a vehicle body frame has been constructed such that a plurality of attaching members each extending substantially over the entirety of the power unit in the vehicle width directions are arranged with intervals in the frontward and rearward directions or, alternatively, such that a plurality of pairs of attaching members in which attaching members of each pair are arranged with a constant interval in the vehicle width directions are arranged with intervals in the frontward and rearward directions. Prior art references concerning such a utility vehicle on which a power unit is mounted include U.S. Pat. No. 7,506,718 and U.S. Pat. No. 8,727,063.

SUMMARY OF THE INVENTION

Here, in a case that an output shaft for transmitting the power of the power unit is provided such as to extend in the frontward and rearward directions with going through the body part of the power unit, a torque generated by revolution of the output shaft acts on the power unit.

Thus, an object of the present invention is to provide a mounting structure for power unit that is employed in a power unit of a utility vehicle including an output shaft going through the body part of the power unit and that can effectively support a running torque of the output shaft.

In order to achieve the above-mentioned object, a first invention of the present application is a mounting structure for a power unit of a utility vehicle, wherein the power unit includes:
a body part;
an output shaft extending in frontward and rearward directions through the body part;
a first attaching member provided with a first damper and attaching a lower end part of the body part to a vehicle body frame of the utility vehicle; and
a torque rod located in an upper part of the body part and constructed between the body part and the vehicle body frame so as to restrict rolling of the body part in vehicle width directions, and wherein
a body side attaching part of the torque rod attached to the body part is located on an extension line of a compression axis direction of the first damper in side view of the power unit.

According to the configuration given above, inside view of the power unit, the body side attaching part of the torque rod attached to the body part is located on an extension line of the compression axis direction of the first damper. Thus, the running torque generated about the output shaft can effectively be supported by the first attaching member.

It is preferable that the first invention further includes the following configurations.

(1) The power unit includes a second attaching member provided with a second damper and attaching a lower end part of the body part to a vehicle body frame of the utility vehicle, and
a centroid of the body part is located on an extension line of a compression axis direction of the second damper in side view of the power unit.

(2) The first attaching member includes a pair of third attaching member provided with a third damper and fourth attaching member provided with a fourth damper which are arranged in the vehicle width directions, and
in front or rear view of the power unit,
a straight line joining a center of the third attaching member and a center of the output shaft is substantially perpendicular to a compression axis direction of the third damper and
a straight line joining a center of the fourth attaching member and a center of the output shaft is substantially perpendicular to a compression axis direction of the fourth damper.

(3) The torque rod extends in a vehicle width direction from the body side attaching part toward the frame side attaching part of the torque rod attached to the vehicle body frame, and
a straight line joining a center of the output shaft and a center of the body side attaching part is substantially perpendicular to the torque rod.

(4) In the configuration (2) given above, in front or rear view of the power unit, a distance between the third attaching member and the output shaft is substantially equal to a distance between the fourth attaching member and the output shaft.

(5) In the configuration (1) given above, the second attaching member includes a pair of fifth attaching members and sixth attaching member arranged in the vehicle width directions, and
in front or rear view of the power unit, a distance between the fifth attaching member and the output shaft is substantially equal to a distance between the sixth attaching member and the output shaft.

(6) The body part includes an engine and a transmission, and
the engine and the transmission are integrated with each other.

According to the configuration (1), in side view of the power unit, the centroid of the body part is located on an extension line of the compression axis direction of the second damper. Thus, vibrations in the up and down directions and the frontward and rearward directions of the body part of the power unit can effectively be suppressed by the second attaching member.

According to the configuration (2), a pair of the attaching members are provided in the vehicle width directions and then a straight line joining the attaching member and the output shaft is perpendicular to the compression direction of the attaching members. Thus, movement of the body part caused by the running torque generated about the output shaft can effectively be suppressed.

According to the configuration (3), a straight line joining the center of the output shaft and the center of the body side attaching part is substantially perpendicular to the torque rod. Thus, the running torque generated about the output shaft can be converted into a force in a vehicle width direction.

According to the configuration (4), in front or rear view of the power unit, the distance between the third attaching member and the output shaft is substantially equal to the distance between the fourth attaching member and the output shaft. Thus, since the first attaching members are arranged evenly with respect to the output shaft, the effect of suppressing movement of the body part caused by the running torque generated about the output shaft can be improved.

According to the configuration (5), in front or rear view of the power unit, the distance between the fifth attaching member and the output shaft is substantially equal to the distance between the sixth attaching member and the output shaft. Thus, since the second attaching members are arranged evenly with respect to the output shaft, the effect of suppressing movement of the body part caused by the running torque generated about the output shaft can be improved.

According to the configuration (6), the engine and the transmission are integrated with each other. Thus, the arrangement space for the engine and the transmission can be made efficient.

Further, a second invention of the present application is a utility vehicle employing the mounting structure of the first invention.

According to the configuration given above, a utility vehicle is provided that employs a mounting structure for power unit capable of effectively supporting the running torque of the output shaft.

In conclusion, according to the present invention, a mounting structure for power unit is provided that can effectively support the running torque of the output shaft.

DETAILED DESCRIPTION OF THE INVENTION

Overall Structure of Vehicle

Figure 1:
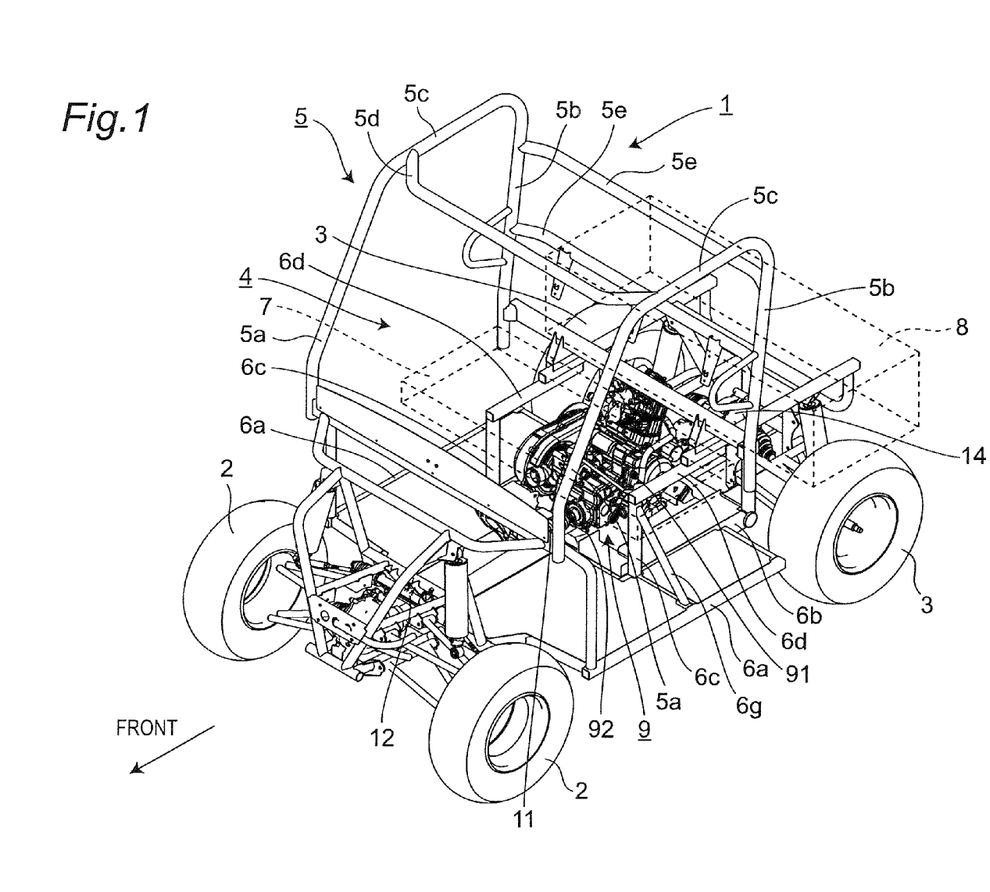
FIG. 1 is a perspective view of a utility vehicle employing a mounting structure for a power unit according to an embodiment of the present invention.
Figure 2:
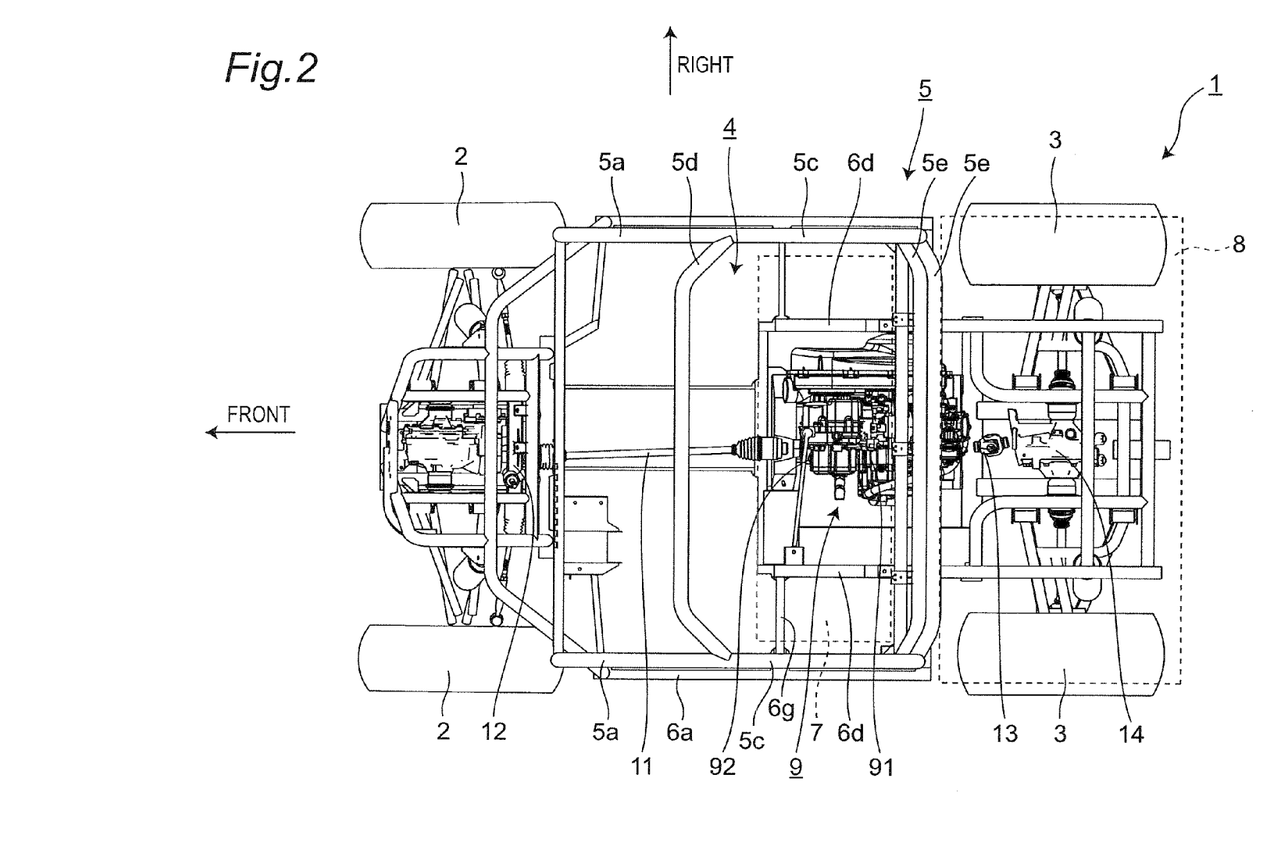
FIG. 2 is a top view of a utility vehicle of FIG. 1.

FIG. 1 is a perspective view of a utility vehicle employing a mounting structure for power unit according to an embodiment of the present invention. The utility vehicle is used mainly for running in off-road circumstances like a grass field, a gravel field, and a sand field as well as an unpaved mountain path, an unpaved path through woods, a mud path, and a rocky field. Here, in the flowing description, it is premised that the concept of direction employed in the present embodiment agrees with the concept of direction viewed from the driver of the utility vehicle. FIG. 2 is a top view of the utility vehicle of FIG. 1 and FIG. 3 is a left side view of the utility vehicle of FIG. 1.

Figure 3:
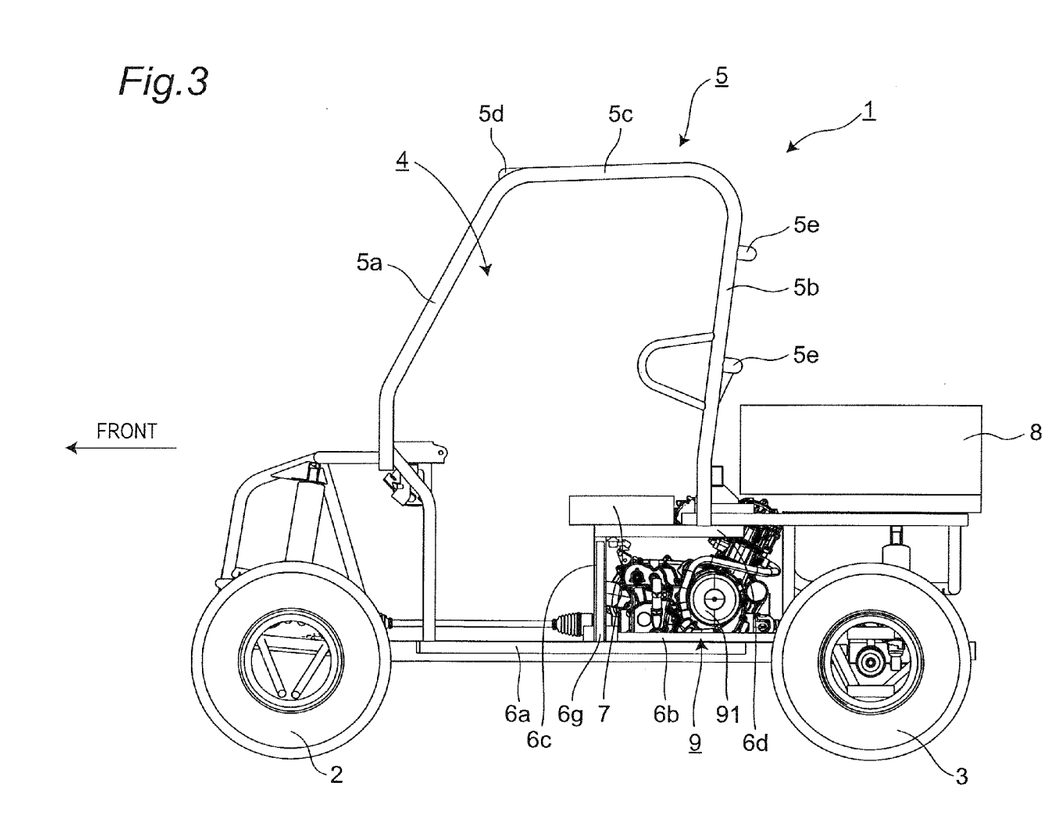
FIG. 3 is a left side view of a utility vehicle of FIG. 1.

As shown in FIGS. 1 to 3, the utility vehicle 1 includes: a pair of right and left front wheels 2 provided in a front part of the vehicle body; a pair of right and left rear wheels 3 provided in a rear part of the vehicle body; and a riding space (cabin) 4 between the front wheels 2 and the rear wheels 3.

The riding space 4 is surrounded by a ROPS 5. The ROPS 5 is an abbreviation of rollover protective structure and constitutes a part of a vehicle body frame. The ROPS 5 includes: a pair of right and left front longitudinal members 5a; a pair of right and left rear longitudinal members 5b; a pair of right and left upper end beam members 5c for linking the upper end parts of the longitudinal members 5a and 5b; an upper transverse member 5d for linking the pair of right and left upper end beam members 5c; and a plurality of rear transverse members 5e for linking the pair of right and left rear longitudinal members 5b. Further, the utility vehicle 1 includes as the vehicle body frame: a pair of right and left outer frame members 6a located at both ends in the vehicle width directions and extending in the frontward and rearward directions; a pair of right and left inner frame members 6b which are located in a middle part in the vehicle width directions and extend in the frontward and rearward directions and the rear end parts of which are linked to the longitudinal members 5b; a pair of right and left inner longitudinal frame members 6c extending upward from the inner frame members 6b; and a pair of right and left rear frame members 6d linked to the upper end parts of the inner longitudinal frame members 6c and extending rearward. Then, a seat 7 of bench type is provided in the riding space 4 and a cargo bed 8 is provided behind the riding space 4.

A power unit 9 is arranged under the seat 7. The power unit 9 is constructed such that an engine and a transmission are integrated with each other. The engine is a single cylinder engine and the cylinder extends upward in a manner of being inclined rearward. As a result, the upper rear part of the cylinder block is located behind the seat 7 and under a front part of the cargo bed 8.

The power unit 9 includes an output shaft 92 extending in the frontward and rearward directions with going through the body part 91 of the power unit 9. The front end part of the output shaft 92 is linked to a front side propeller shaft 11 extending in the frontward and rearward directions and the front end part of the front side propeller shaft 11 is linked to a front side differential mechanism 12 extending in the vehicle width directions. Then, the driving force of the power unit 9 is transmitted to the front side propeller shaft 11 and then transmitted to the right and left front wheels 2 in a manner of being distributed by the front side differential mechanism 12.

Further, the rear end part of the output shaft 92 is linked to a rear side propeller shaft 13 extending in the frontward and rearward directions and the rear end part of the rear side propeller shaft 13 is linked to a rear side differential mechanism 14 extending in the vehicle width directions. Then, the driving force of the power unit 9 is transmitted to the rear side propeller shaft 13 and then transmitted to the right and left rear wheels 3 in a manner of being distributed by the rear side differential mechanism 14.

[Structure of Power Unit]

Figure 4:
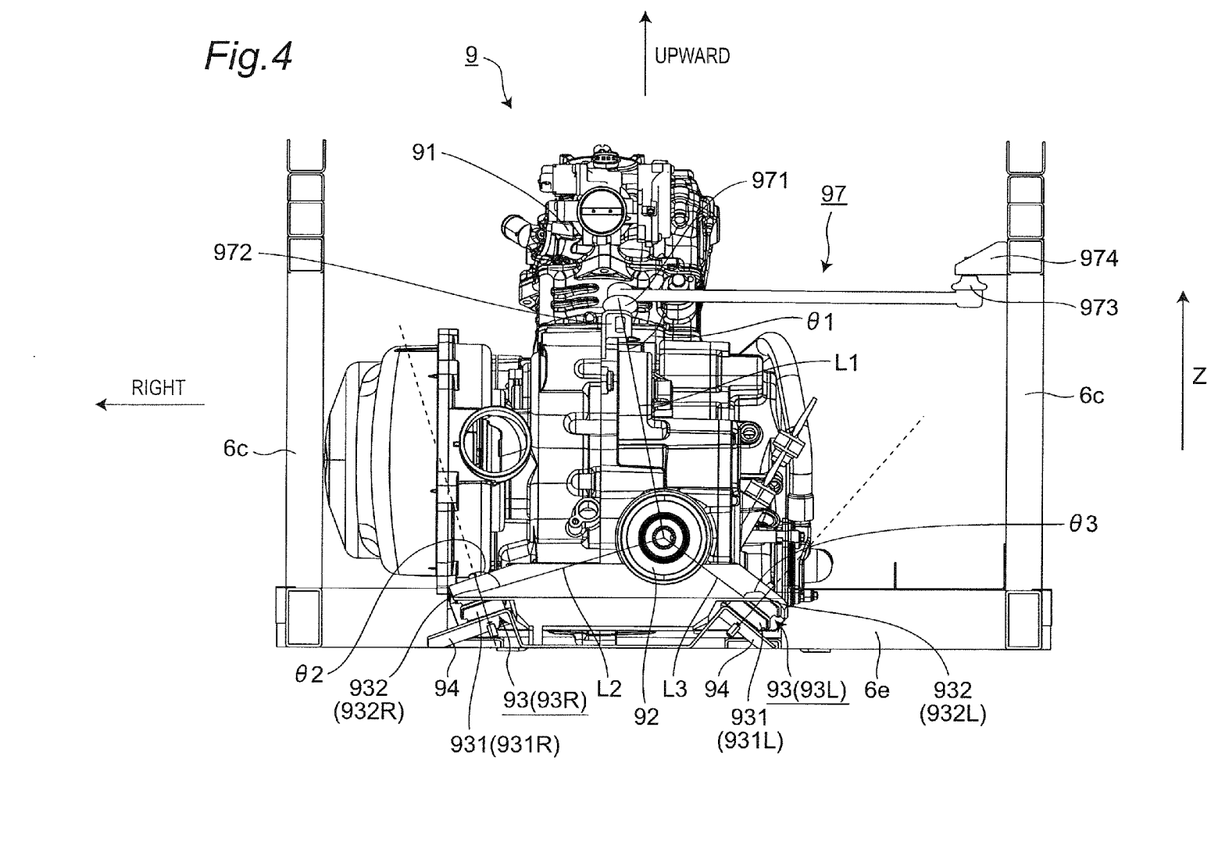
FIG. 4 is a front view of a power unit of FIG. 1.
Figure 5:
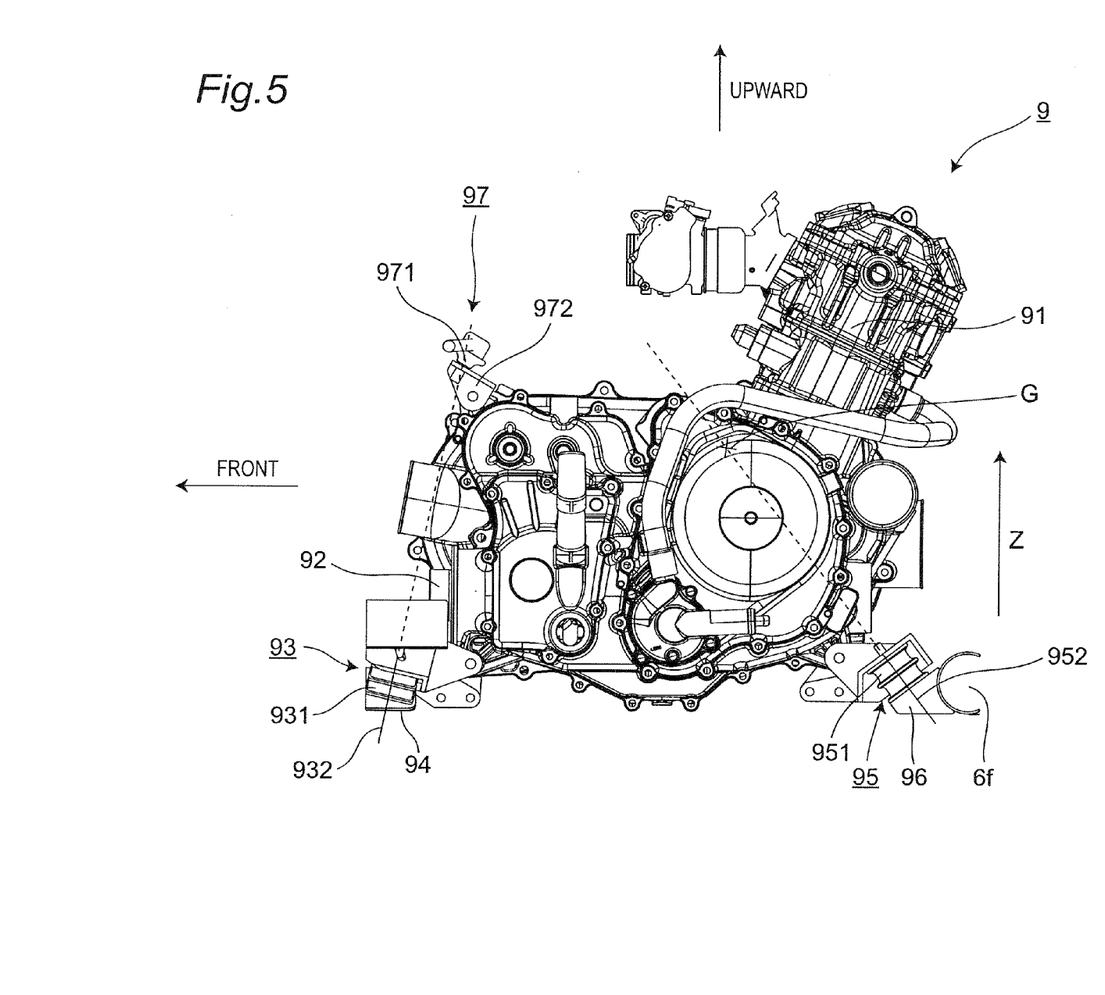
FIG. 5 is a side view of a power unit of FIG. 1.
Figure 6:
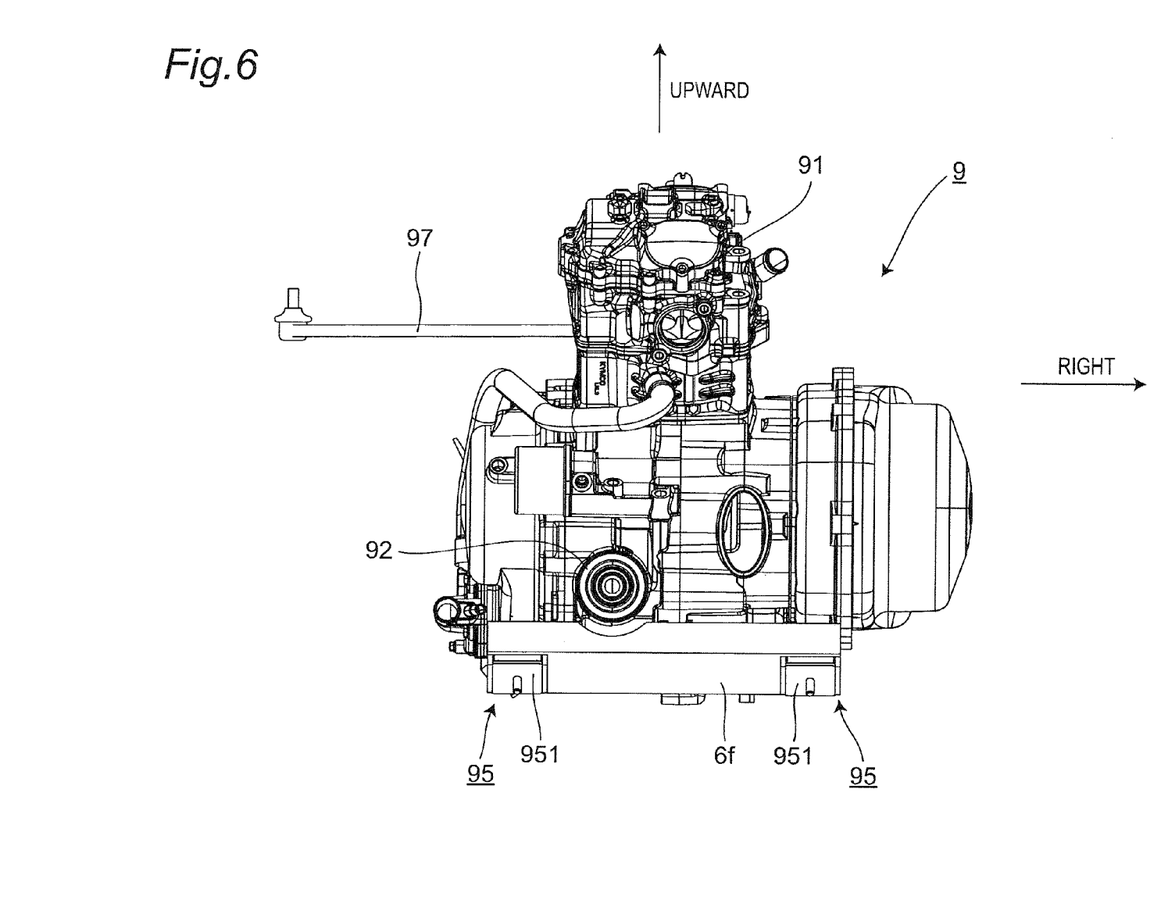
FIG. 6 is a rear view of a power unit of FIG. 1.

FIG. 4 is a front view of the power unit 9 of FIG. 1, FIG. 5 is a side view of the power unit 9 of FIG. 1, and FIG. 6 is a rear view of the power unit 9 of FIG. 1. Here, a situation that the power unit 9 is viewed from the frontward or the rearward direction of the utility vehicle 1 is referred to as a front or rear view of the power unit 9. Thus, a diagram of front or rear view of the power unit 9 corresponds to the front view and the rear view given above. Further, a situation that the power unit 9 is viewed from a vehicle width direction of the utility vehicle 1 is referred to as a side view of the power unit 9. Thus, a diagram of side view of the power unit 9 corresponds to the side view given above.

As shown in FIGS. 4 to 6, the body part 91 of the power unit 9 is supported on the vehicle body frame by a pair of right and left first attaching members 93 located in a front part of the body part 91 and by a pair of right and left second attaching members 95 located in a rear part of the body part 91. Specifically, the front lower end part of the body part 91 is attached through brackets 94 to a cross frame member 6e for linking the inner longitudinal frame members 6c, by the first attaching members 93. Each first attaching member 93 is provided with a first damper 931 and then the attaching surface of the bracket 94 to which the first attaching member 93 is attached is inclined relative to the horizontal plane. Thus, the compression axis 932 direction of the first damper 931 is inclined relative to the vertical axis Z. The first damper 931 is formed by a method that three metal plates aligned in the compression axis 932 direction are linked to each other by baking two rubber members located between the metal plates. That is, the first damper 931 is formed by stacking the two rubber members located between the three metal plates in the compression axis 932 direction.

The rear lower end part of the body part 91 is attached through brackets 96 to a cross frame member 6f for linking the inner frame members 6b, by the second attaching members 95. Each second attaching member 95 is provided with a second damper 951 and then the attaching surface of the bracket 96 to which the second attaching member 95 is attached is inclined relative to the horizontal plane. Thus, the compression axis 952 direction of the second damper 951 is inclined relative to the vertical axis Z. Similarly to the first damper 931, the second damper 951 is formed by a method that three metal plates aligned in the compression axis 952 direction are linked to each other by baking two rubber members located between the metal plates. That is, the second damper 951 is formed by stacking the two rubber members located between the three metal plates in the compression axis 952 direction. Then, as shown in FIG. 5, in side view of the power unit 9, the centroid G of the body part 91 is located on an extension line of the compression axis 952 direction of the second damper 951. Here, it is sufficient that the position of the centroid G is located on an extension line of the compression axis 952 direction in side view of the power unit 9. That is, the position may be deviated in the vehicle width directions.

As shown in FIG. 4, in an upper part of the body part 91, a torque rod 97 is provided that is constructed between the body part 91 and the inner longitudinal frame member 6c and restricts rolling of the body part 91 in the vehicle width directions. In the torque rod 97, a body side attaching part 971 thereof is attached through a bracket 972 to the front part upper end part of the body part 91 and a frame side attaching part 973 thereof is attached through a bracket 974 to the inner longitudinal frame member 6c. The torque rod 97 extends in a vehicle width direction from the body side attaching part 971 toward the frame side attaching part 973. Then, a straight line l1 joining the center of the output shaft 92 and the center of the body side attaching part 971 and the torque rod 97 form an angle θ1. Preferably, the angle θ1 is approximately 90 degrees. However, the angle θ1 may be 75 degrees to 105 degrees or the like. Here, in order to support the compression force of the torque rod 97 that receives a driving torque reaction force, the inner longitudinal frame members 6c for supporting the torque rod 97 on the frame side are linked to the outer frame members 6a by oblique members 6g (FIGS. 1-3) so that rigidity is improved.

Then, as shown in FIG. 5, in side view of the power unit 9, the body side attaching part 971 is located on an extension line of the compression axis 932 direction of the first damper 931. Here, it is sufficient that the position of the body side attaching part 971 is located on an extension line of the compression axis 932 direction in side view of the power unit 9. That is, the position may be deviated in the vehicle width directions.

As shown in FIG. 4, in front view of the power unit 9, a straight line L2 joining the center of the right-side first attaching member (the third attaching member) 93R and the center of the output shaft 92 and the compression axis 932R direction of the right-side first damper (the third damper) 931R form an angle θ2. Preferably, the angle θ2 is approximately 90 degrees. Further, in front view of the power unit 9, a straight line L3 joining the center of the left-side first attaching member (the fourth attaching member) 93L and the center of the output shaft 92 and the compression axis 932L direction of the left-side first damper (the fourth damper) 931L form an angle 93. Preferably, the angle θ3 is approximately 90 degrees.

According to the mounting structure for the power unit 9 having the configuration given above, the following effects can be obtained.

(1) In side view of the power unit 9, the body side attaching part 971 of the torque rod 97 attached to the body part 91 is located on an extension line of the compression axis 932 direction of the first damper 931. Thus, the running torque generated about the output shaft 92 can effectively be supported by the first attaching members 93.

(2) In side view of the power unit 9, the centroid G of the body part 91 is located on an extension line of the compression axis 952 direction of the second damper 951. Thus, vibrations in the up and down directions and the frontward and rearward directions of the body part 91 of the power unit 9 can effectively be suppressed by the second attaching members 95.

(3) In front view of the power unit 9, a pair of third attaching member 93R and fourth attaching member 93L are provided in the vehicle width directions. Then, a straight line L2 joining the center of the third attaching member 93R and the center of the output shaft 92 and the compression axis 932R direction of the third damper 931R are approximately at right angles to each other. Further, a straight line L3 joining the center of the fourth attaching member 93L and the center of the output shaft 92 and the compression axis 932L direction of the fourth damper 931L are approximately at right angles to each other. Thus, movement of the body part 91 caused by the running torque generated about the output shaft 92 can effectively be suppressed.

(4) A straight line L1 joining the center of the output shaft 92 and the center of the body side attaching part 971 and the torque rod 97 are approximately at right angles to each other. Thus, the running torque generated about the output shaft 92 can be converted into a force in a vehicle width direction. Here, vibrations generated by the force in the vehicle width direction have a smaller influence to the ride comfort than vibrations in the up and down directions. Thus, when the running torque generated about the output shaft 92 is converted into a force in a vehicle width direction, the ride comfort of the utility vehicle 1 is improved.

(5) In the power unit 9, the engine and the transmission are integrated with each other. Thus, the arrangement space for the engine and the transmission can be made efficient. Further, when the engine and the transmission are integrated with each other, the vibration characteristic of the power unit 9 can be made uniform.

(6) Each of the first damper 931 and the second damper 951 is formed by stacking two rubber members located between three metal plates in the compression axis 932 or 952 direction. Thus, the compressive strength in the compression axis 932 or 952 direction is improved and hence the force acting in the compression axis 932 or 952 direction can more effectively be supported.

(Modification)

Figure 7:
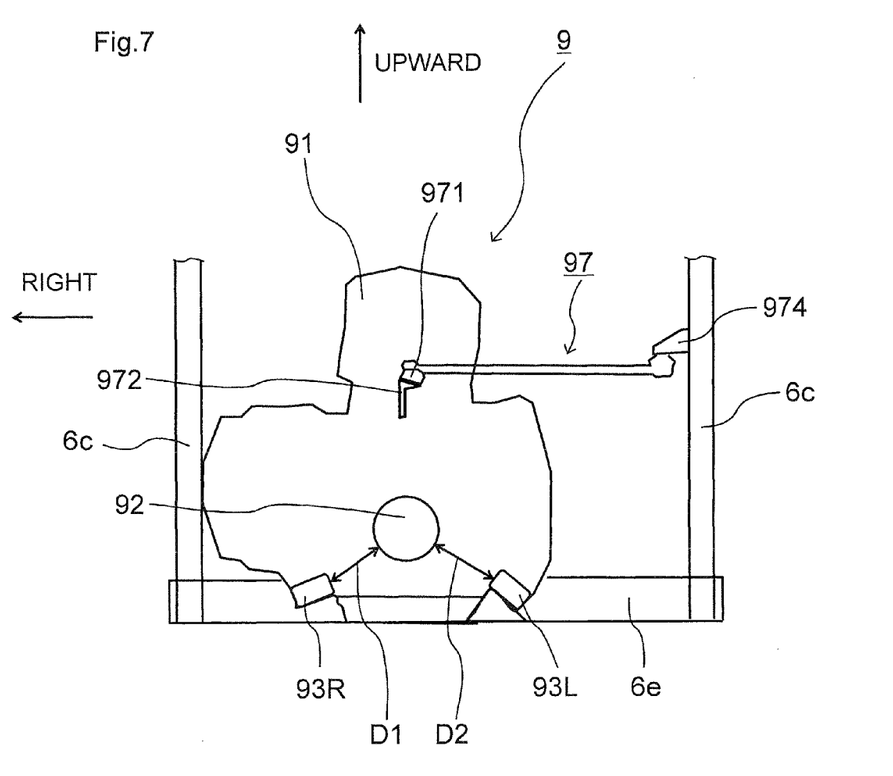
FIG. 7 is a front view of a power unit, showing a modification of a mounting structure for power unit.
Figure 8:
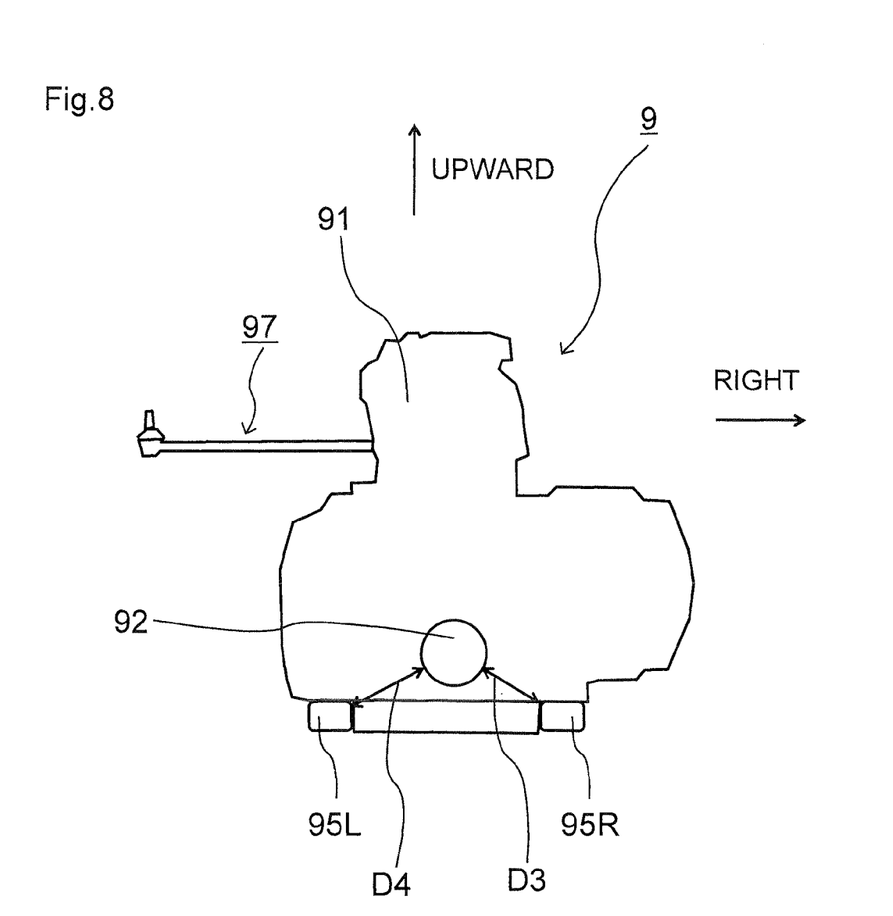
FIG. 8 is a rear view of a power unit, showing a modification of a mounting structure for power unit.

FIGS. 7 and 8 show a modification of a mounting structure for power unit. FIG. 7 is a front view of a power unit 9 and FIG. 8 is a rear view of the power unit 9. In the modification, the positional relation between the output shaft and the attaching member is different from that in the embodiment given above. The other points in the configuration are the same as those of the embodiment given above. Thus, in the description of the modification, like components and parts to the embodiment given above are designated by like numerals and hence their detailed description is omitted.

As shown in FIG. 7, in front view of the power unit 9, the distance D1 between the right-side first attaching member (the third attaching member) 93R and the output shaft 92 is substantially equal to the distance D2 between the left-side first attaching member (the fourth attaching member) 93L and the output shaft 92.

As shown in FIG. 8, in rear view of the power unit 9, the distance D3 between the right-side second attaching member (the fifth attaching member) 95R and the output shaft is substantially equal to the distance D4 between the left-side second attaching member (the sixth attaching member) 95L and the output shaft 92.

According to the configuration given above, in front view of the power unit 9, the distance D1 between the third attaching member 93R and the output shaft 92 is substantially equal to the distance D2 between the fourth attaching member 93L and the output shaft 92. Thus, since the attaching members are arranged evenly with respect to the output shaft 92, the effect of suppressing movement of the body part 91 caused by the running torque generated about the output shaft 92 can be improved in the front part of the body part 91. Further, in rear view of the power unit 9, the distance D3 between the fifth attaching member 95R and the output shaft 92 is substantially equal to the distance D4 between the sixth attaching member 95L and the output shaft 92. Thus, since the attaching members are arranged evenly with respect to the output shaft 92, the effect of suppressing movement of the body part 91 caused by the running torque generated about the output shaft 92 can be improved in the rear part of the body part 91.

In the embodiment given above, one torque rod 97 has been provided. Instead, a plurality of torque rods may be provided so as to restrict rolling of the body part 91 in the vehicle width directions.

In the embodiment given above, as for the attaching members for attaching the lower end part of the body part 91 to the vehicle body frame, a pair of right and left attaching members have been provided in each of the front part and the rear part of the body part 91. Instead, as for the frontward and rearward directions, an attaching member may be provided at one position alone in the middle part of the frontward and rearward directions or, alternatively, may be provided at each of three positions respectively in a front part, a middle part, and a rear part. Further, an attaching member may be provided at each of four or more positions. Further, as for the vehicle width directions, in place of a pair of the right and left attaching members, an attaching member may be provided at one position alone in the middle part of the vehicle width directions of the body part 91. Further, an attaching member may be provided at each of three positions respectively in a left part, a middle part, and a right part or, alternatively, at each of four or more positions.

In the embodiment given above, the power unit 9 has been constructed such that the engine and the transmission are integrated with each other. Instead, the engine and the transmission may be constructed separately from each other. In this case, it is preferable that the transmission is linked through a connecting bracket to one end part of the engine in the frontward and rearward directions. Further, it is preferable that the connecting bracket is attached to the vehicle body frame by an attaching member provided with a damper. When the engine and the transmission are constructed separately from each other and then linked to each other through a connecting bracket, a margin can be ensured in the arrangement of the engine and the transmission.

Various modifications and changes may be made without departing from the spirit and the scope of the present invention described in the claim.

The invention claimed is:

1. A mounting structure for a power unit of a utility vehicle, wherein the power unit includes:
    a body part;
    an output shaft extending in frontward and rearward directions through the body part;
    a first attaching member provided with a first damper and attaching a lower end part of the body part to a vehicle body frame of the utility vehicle; and
    a torque rod located in an upper part of the body part and constructed between the body part and the vehicle body frame so as to restrict rolling of the body part in vehicle width directions, and wherein
    a body side attaching part of the torque rod attached to the body part is located on an extension line of a compression axis direction of the first damper in side view of the power unit.

2. The mounting structure for a power unit according to claim 1, wherein:
    the power unit includes a second attaching member provided with a second damper and attaching a lower end part of the body part to the vehicle body frame of the utility vehicle; and
    a centroid of the body part is located on an extension line of a compression axis direction of the second damper in side view of the power unit.

3. The mounting structure for a power unit according to claim 2, wherein:
    the second attaching member includes a fifth attaching member and a sixth attaching member, and the fifth attaching member and the sixth attaching member are arranged in the vehicle width directions; and
    in a front view or a rear view of the power unit, a distance between the fifth attaching member and the output shaft is substantially equal to a distance between the sixth attaching member and the output shaft.

4. The mounting structure for a power unit according to claim 1, wherein:
    the first attaching member includes a third attaching member provided with a third damper and a fourth attaching member provided with a fourth damper, and the third attaching member and the fourth attaching member are arranged in the vehicle width directions; and
    in a front view or a rear view of the power unit,
    a straight line joining a center of the third attaching member and a center of the output shaft is substantially perpendicular to a compression axis direction of the third damper, and a straight line joining a center of the fourth attaching member and a center of the output shaft is substantially perpendicular to a compression axis direction of the fourth damper.

5. The mounting structure for a power unit according to claim 4, wherein in a front view or a rear view of the power unit, a distance between the third attaching member and the output shaft is substantially equal to a distance between the fourth attaching member and the output shaft.

6. The mounting structure for a power unit according to claim 1, wherein:
   the torque rod extends in a vehicle width direction from the body side attaching part toward a frame side attaching part of the torque rod attached to the vehicle body frame; and
   a straight line joining a center of the output shaft and a center of the body side attaching part is substantially perpendicular to the torque rod.

7. The mounting structure for a power unit according to claim 1, wherein:
   the body part includes an engine and a transmission; and
   the engine and the transmission are integrated with each other.

8. A utility vehicle employing the mounting structure for a power unit according to claim 1.

* * * * *